US007014244B1

(12) United States Patent
Baldwin

(10) Patent No.: US 7,014,244 B1
(45) Date of Patent: Mar. 21, 2006

(54) AUXILIARY SUN VISOR

(76) Inventor: Jeffrey B. Baldwin, 7776 Joshua Villa La., Corona, CA (US) 92881

( * ) Notice: Subject to any disclaimer, the term of this patent is extended or adjusted under 35 U.S.C. 154(b) by 0 days.

(21) Appl. No.: 11/047,596

(22) Filed: Feb. 2, 2005

(51) Int. Cl.
*B60J 3/00* (2006.01)
(52) U.S. Cl. .................................... 296/97.9
(58) Field of Classification Search ............. 296/97.9, 296/97.1, 97.11; 40/663, 299.01, 331
See application file for complete search history.

(56) References Cited

U.S. PATENT DOCUMENTS

| | | | | |
|---|---|---|---|---|
| 1,345,782 A | * | 7/1920 | Keller | 40/673 |
| 2,535,576 A | * | 12/1950 | Hodges, Sr. | 40/643 |
| 2,549,395 A | * | 4/1951 | Short, Sr. | 296/97.5 |
| 2,620,222 A | * | 12/1952 | Beauchamp | 296/97.6 |
| 2,756,525 A | * | 7/1956 | Greenberger | 40/315 |
| 2,922,676 A | * | 1/1960 | Czajkowski | 296/97.8 |
| 4,172,613 A | | 10/1979 | Furando | |
| 4,862,617 A | * | 9/1989 | Cooke et al. | 40/663 |
| 4,940,273 A | * | 7/1990 | Konishi | 296/97.6 |
| 4,958,879 A | | 9/1990 | Gillum | |
| D315,541 S | | 3/1991 | Rebeck | |
| D316,392 S | | 4/1991 | Rebeck | |
| D317,430 S | | 6/1991 | Dowd et al. | |
| 5,092,066 A | * | 3/1992 | Brewster | 40/617 |
| 5,421,632 A | | 6/1995 | Adomeit et al. | |
| D369,756 S | * | 5/1996 | Noel | D10/64 |
| 5,575,522 A | | 11/1996 | Robinson | |
| 5,575,523 A | | 11/1996 | Keller | |
| 5,848,488 A | * | 12/1998 | Norwood | 40/617 |
| D403,709 S | * | 1/1999 | Norwood | D20/42 |
| 5,951,091 A | | 9/1999 | VanderKuyl et al. | |
| 5,979,967 A | | 11/1999 | Poulson | |
| 6,102,199 A | * | 8/2000 | Ho | 206/214 |
| 6,296,293 B1 | | 10/2001 | Peterson et al. | |
| 6,296,294 B1 | | 10/2001 | Kohnle et al. | |
| 6,330,758 B1 | * | 12/2001 | Feibelman | 40/299.01 |
| 6,513,855 B1 | | 2/2003 | Zenisek | |
| 6,564,981 B1 | * | 5/2003 | Murphy | 224/277 |
| 6,682,122 B1 | | 1/2004 | Prokhorov | |
| D495,639 S | * | 9/2004 | Sheridan | D12/191 |
| 6,898,880 B1 | * | 5/2005 | Best et al. | 40/299.01 |
| 2002/0135197 A1 | * | 9/2002 | Howard | 296/97.7 |
| 2004/0165275 A1 | | 8/2004 | Smoot | |
| 2005/0073168 A1 | * | 4/2005 | Herrera | 296/97.1 |

FOREIGN PATENT DOCUMENTS

JP 10-291417 11/1998

OTHER PUBLICATIONS www.wdrake.com/ (lsnmyg45ekobyd55xhybuo55) / product details.aspx?item no=1006777&src=smx; Car Sun Visor; Walter Drake; Dec. 10, 2004.
www.k-view.com; K-View; Dec. 10, 2004.

* cited by examiner

*Primary Examiner*—H. Gutman
(74) *Attorney, Agent, or Firm*—Richard C. Litman

(57) ABSTRACT

The auxiliary sun visor is a sun-blocking device that attaches onto the post of a rearview mirror and blocks sunlight coming in over the rearview mirror and through gaps between the vehicle's existing sun visors. The auxiliary sun visor is a rectangular panel, which has two L-shaped slots of varying sizes extending inwardly from opposing edges of the panel. The auxiliary sun visor is slid onto the post and shifted laterally so that the post is seated within one of the L-shaped slots, thus securing the auxiliary sun visor onto the post. Once mounted onto the rearview mirror, the auxiliary sun visor is positioned between the vehicle's two permanent sun visors.

18 Claims, 4 Drawing Sheets

AUXILIARY SUN VISOR

BACKGROUND OF THE INVENTION

1. Field of the Invention

The present invention relates to sun visors, and particularly to an auxiliary sun visor for attachment to a post of a rearview mirror.

2. Description of the Related Art

All automobiles generally come equipped with two sun visors, including one on the driver's side and one on the passenger's side. While the existing sun visors provide a level of protection against sunlight coming in through the windshield of the vehicle, depending on the position of the sun and the position of the vehicle, they may fail to block light that shines through gaps between the visors. The visors only cover the area immediately in front of the driver or passenger, but often fail to adequately cover the areas above the rearview mirror and between the rearview mirror and the existing visors.

While auxiliary sun visors have been devised, some are permanently installed in the vehicle, which does not allow for easy removal when they are unnecessary. Other auxiliary visors require the use of some type of retention means to keep the auxiliary visor affixed to the rearview mirror, adding to costs associated with the manufacture of the visor. Further, it is necessary that auxiliary visors be able to fit onto rearview mirrors of varying size or which have posts of varying thickness.

Accordingly, there is a need for an easily removable auxiliary sun visor that omits superfluous retention devices and is able to function with different sizes and types of rearview mirrors. Thus, an auxiliary sun visor solving the aforementioned problems is desired.

SUMMARY OF THE INVENTION

The auxiliary sun visor is a sun-blocking device that attaches onto the post of a rearview mirror and blocks sunlight coming in over the rearview mirror and through gaps between the vehicle's existing sun visors. The auxiliary sun visor is a rectangular panel of cardboard or other material, which has two L-shaped slots extending inwardly from opposing edges of the panel. Once mounted onto the rearview mirror, the auxiliary sun visor is positioned between the vehicle's two permanent sun visors.

The L-shaped slots may be medially (i.e., towards the middle) located or positioned slightly off-center so that when the visor is applied to the post, the visor covers more of the area toward the passenger's side, providing the driver with more coverage on his right side. The L-shaped slots are of varying sizes, and either slot may be slipped down over the post of the rearview mirror. To attach the sun visor to the rearview mirror, the leg of one of the L-shaped slots engages the post. The auxiliary sun visor is slid down onto the post to the end of one leg of the slot, and then shifted laterally so that the post is at the end of the other leg of the slot, thus securing the auxiliary sun visor onto the post.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
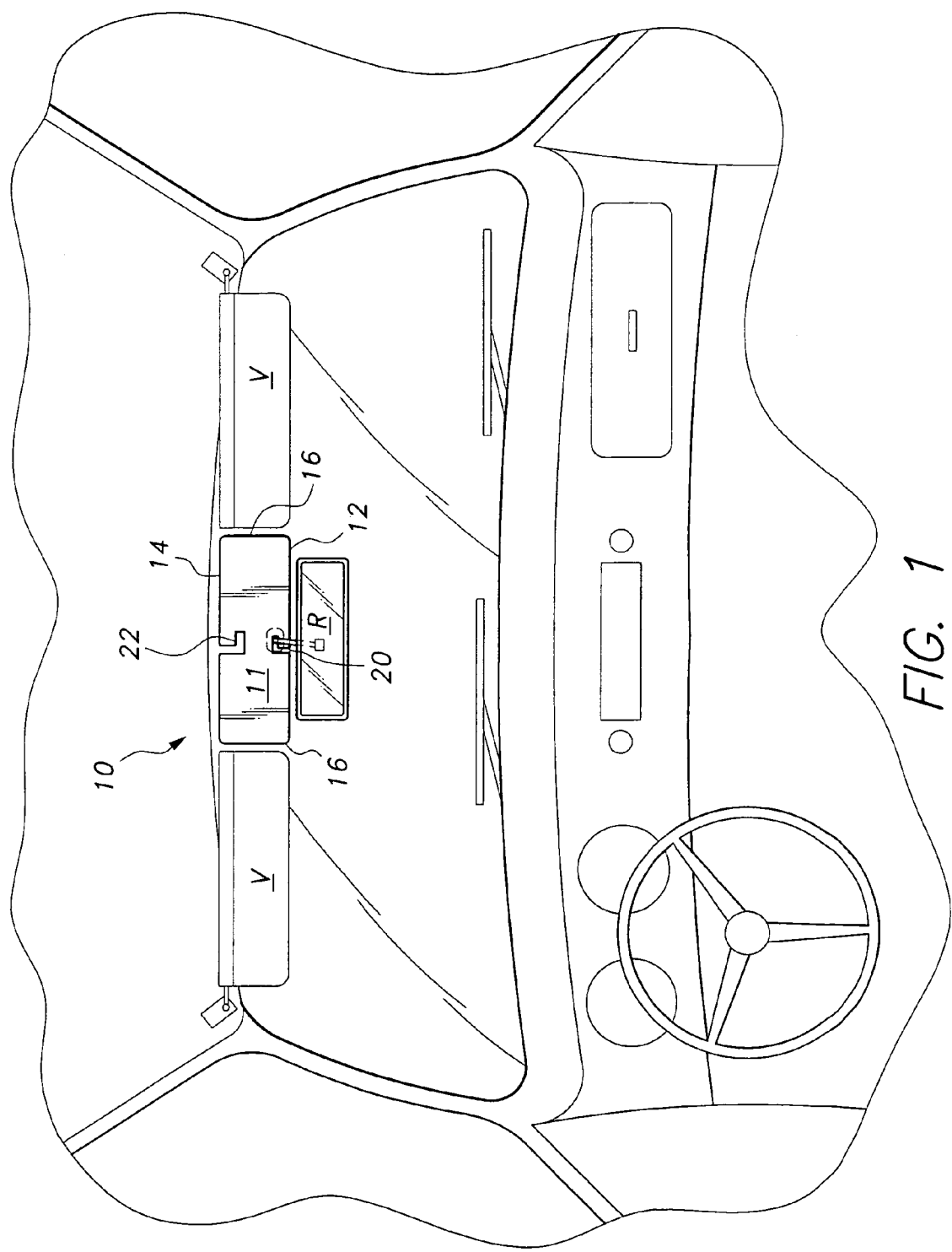
FIG. 1 is an environmental view of an auxiliary sun visor according to the present invention.

The present invention is an auxiliary sun visor designed to attach onto the post of a rearview mirror. The auxiliary sun visor, designated generally as 10 in the drawings, blocks the sunlight coming in over the rearview mirror and through gaps between the vehicle's existing sun visors.

Referring first to FIG. 1, an environmental view of the auxiliary sun visor 10 is shown. The auxiliary sun visor 10 is a rectangular panel 11 having a periphery defined by a first edge 12, a second edge 14 opposite the first edge 12, and opposing side edges 16. A first L-shaped slot 20 extends inwardly from the first edge 12 of the panel 11. A second L-shaped slot 22 extends inwardly from the second edge 14 of the panel 11. Once mounted onto the rearview mirror R, the auxiliary sun visor 10 is positioned between the vehicle's two permanent sun visors V, blocking sunlight that may come into the vehicle over the rearview mirror R.

Figure 2:
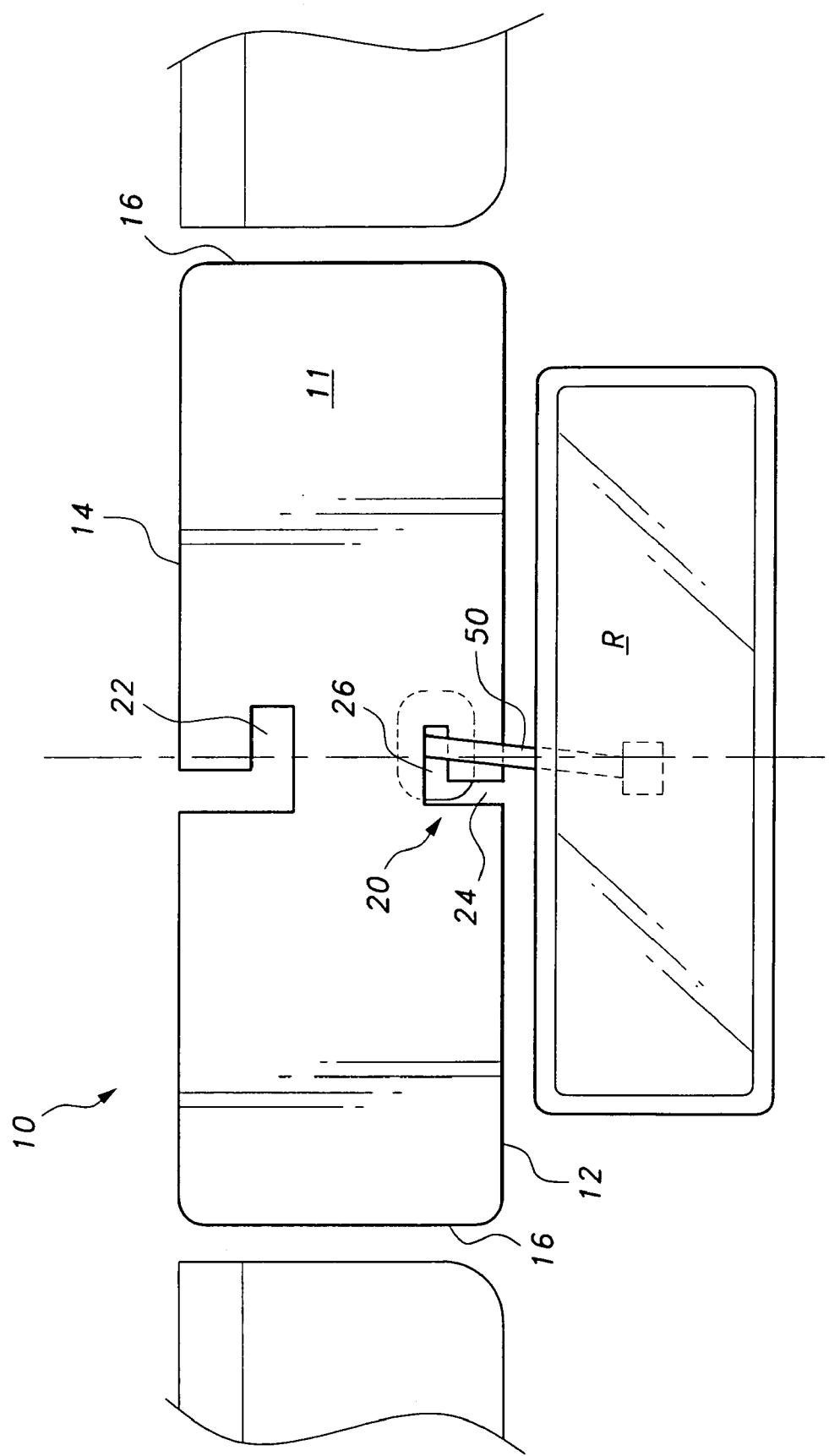
FIG. 2 is a detailed environmental front view of the auxiliary sun visor according to the present invention.

Turning now to FIG. 2, a detailed front view of the auxiliary sun visor 10 is shown. The rectangular panel 11 may be made from a heavy-duty paper, such as cardboard, plastic, or any other material suitable to be retained on a post 50 of a rearview mirror R. The panel 11 may also be covered with cloth, upholstery, or any other suitable cover. The rectangular panel 11 has a length of between about twelve and sixteen inches and a width of between about four and eight inches.

Either of the L-shaped slots 20 and 22 may be slipped down over the post 50 of the rearview mirror R. The first L-shaped slot 20 is located between the opposing side edges 16 and extends inward into the panel 11 from the first edge 12 of the panel 11. The second L-shaped slot 22 is located between the opposing side edges 16 and extends into the panel from the second edge 14 of the panel 11. The L-shaped slots 22 are medially (i.e., towards the middle, rather than towards the lateral edges) located between the opposing side edges 16 and may be offset from the center just slightly toward one or the other side edge 16.

The first L-shaped slot 20 is narrower than the second L-shaped slot 22 so that one auxiliary sun visor 10 may be adapted to fit onto rearview mirror posts of differing sizes. As the auxiliary sun visor 10 is removable and has two slots 20 and 22 of varying sizes, a user may use the same auxiliary visor 10 for multiple vehicles.

The L-shaped slot 20 is adapted to slide onto the post 50 of the rearview mirror R. The slot 20 has a first leg 24 extending inwardly from the first edge 12 and a second leg 26 normal to the first leg 24. When the auxiliary sun visor 10 is put onto the post 50, the second leg 26 frictionally grips the post 50 in order to retain the auxiliary sun visor 10 on the post 50 of the rearview mirror R. The L-shape of the slot 20 also helps to prevent the visor 10 from sliding off of the post 50.

Figure 3A:
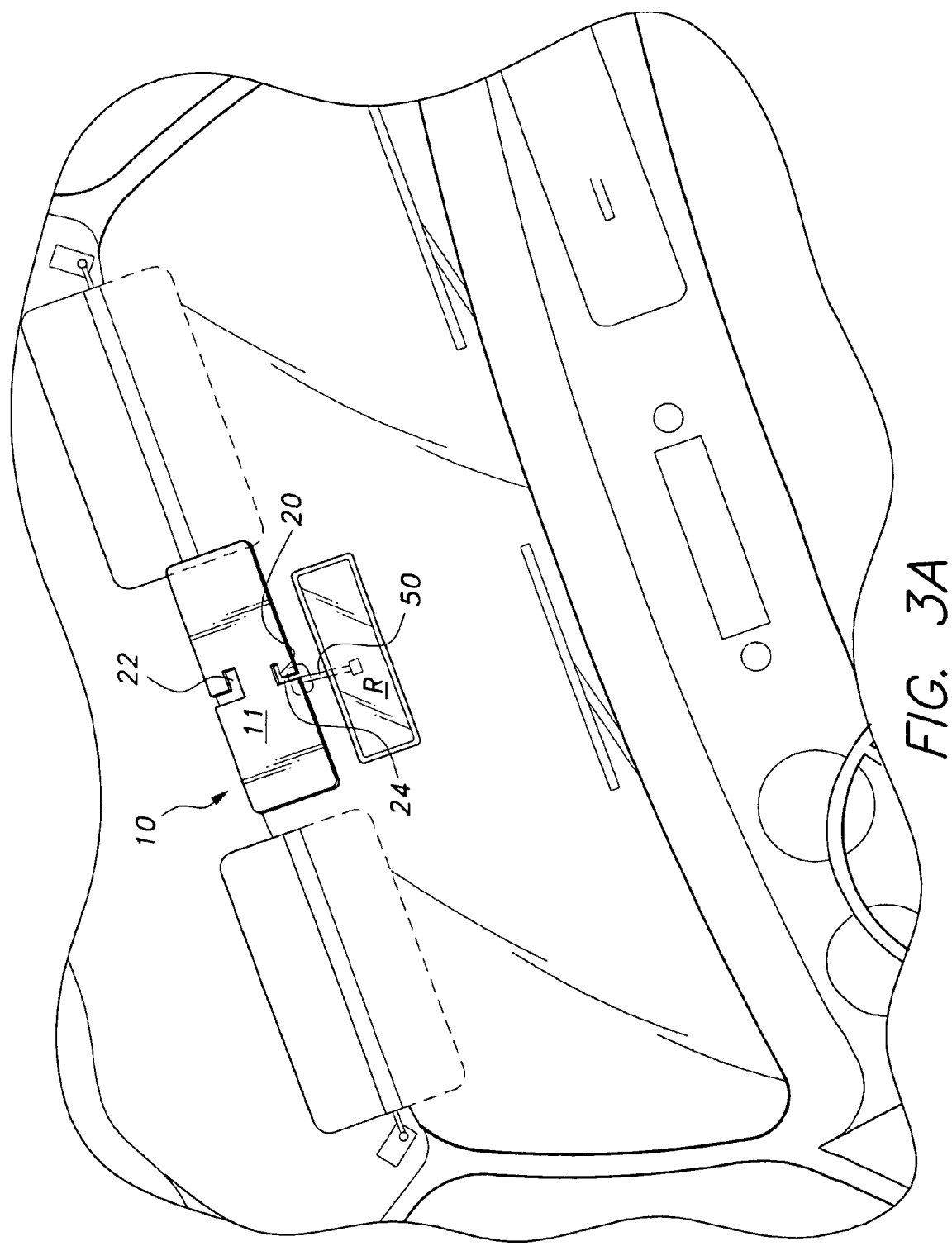
FIG. 3A is an environmental perspective view of the auxiliary sun visor according to the present invention in a first position.
Figure 3B:
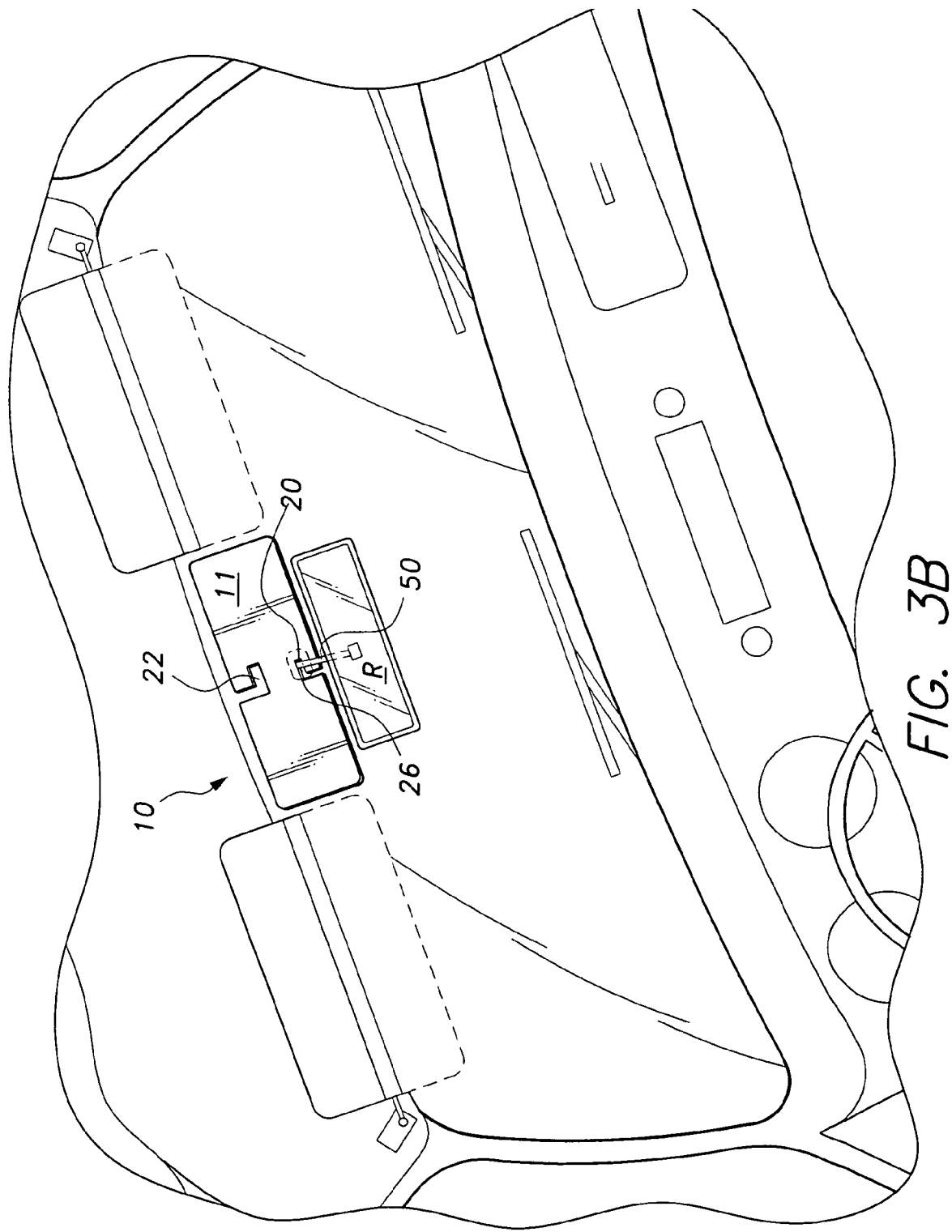
FIG. 3B is an environmental perspective view of the auxiliary sun visor according to the present invention in a second position.

Referring now to FIGS. 3A and 3B, the auxiliary sun visor 10 is shown in a first and a second position, respectively.

FIG. 3A shows the auxiliary sun visor 10 being positioned to slide the first leg 24 of the slot 20 onto the post 50. FIG. 3B shows the visor 10 after sliding the visor laterally to lodge the post 50 at the closed end of the second leg 26 of the slot 20. To attach the sun visor 10 to the rearview mirror R, the leg 24 of L-shaped slot 20 engages the post 50. The auxiliary sun visor 10 is slipped down onto the post 50. The auxiliary visor 10 is then shifted laterally so that the post 50 is seated within the second leg 26 of L-shaped slot 20. The second leg 26 of the slot 20 may face one or the other side edge 16, depending on the needs of the user. For example, a user may be more interested in protecting against the sun shining into the automobile from the right side of the driver, and therefore may prefer to have the second leg 26 of the slot 20 face toward the driver's left, so that the visor 10 covers more of the space on the right side of the car. As mentioned above, the visor 10 is retained on the post 50 by the shape of the slot 20, and may be further retained by friction.

The user selects the slot 20 or 22 having a width that conforms more closely to the diameter of the post 50. Thus, the auxiliary sun visor 10 is secured onto the post 50 of the rearview mirror R with minimal additional retention mechanisms. Once the auxiliary sun visor 10 is in position on the post 50, the rectangular panel 11 blocks sunlight coming in above the mirror R and through gaps between the existing visors. As shown, the auxiliary sun visor 10 blocks sunlight that would otherwise pass through the gap between the rearview mirror R and the roof between the permanently installed visors V. The auxiliary sun visor 10 is easily removed by sliding the panel 11 from the post 50 when no longer required or desired.

The auxiliary sun visor 10 may optionally include advertising indicia on the surface of the visor 10 facing outward from the user's automobile.

It is to be understood that the present invention is not limited to the embodiment described above, but encompasses any and all embodiments within the scope of the following claims.

I claim:

1. A sun visor for attachment to a post of a rearview mirror, the sun visor comprising a rectangular panel having a periphery defined by a first edge, a second edge and opposing lateral edges, the panel having a medially located first L-shaped slot extending inwardly from the first edge of the panel, the first L-shaped slot being adapted for slidable attachment onto the post of the rearview mirror; and
wherein the first L-shaped slot is offset from an axis parallel to the opposing lateral edges and bisecting the rectangular panel.

2. The sun visor according to claim 1, wherein the panel is made from paper.

3. The sun visor according to claim 1, wherein the panel is made from cardboard.

4. The sun visor according to claim 1, wherein the panel is made from plastic.

5. The sun visor according to claim 1, wherein the panel has a length between about twelve and sixteen inches.

6. The sun visor according to claim 1, wherein the panel has a width between about four and eight inches.

7. A sun visor for attachment to a post of a rearview mirror, the sun visor comprising:
a rectangular panel having a periphery defined by a first edge, a second edge and opposing lateral edges, the panel having a medially located first L-shaped slot extending inwardly from the first edge of the panel, the first L-shaped slot being adapted for slidable attachment onto the post of the rearview mirror; and
a medially located second L-shaped slot extending inwardly from the second edge of the panel.

8. The sun visor according to claim 7, wherein the second L-shaped slot is offset from an axis parallel to the opposing lateral edges and bisecting the rectangular panel.

9. The sun visor according to claim 7, wherein each of the slots has a first leg and a second leg normal to the first leg, the legs of the first and second L-shaped slots having different widths, whereby the visor is adapted to slide onto rearview mirror posts of different diameter.

10. A sun visor, comprising:
a rearview mirror having a post adapted for attachment to a windshield of a vehicle; and
a rectangular panel having a periphery defined by a first edge, a second edge and opposing lateral edges, the panel having a medially located first L-shaped slot extending inwardly from the first edge of the panel, the first L-shaped slot being slidable onto the post of the rearview mirror; and
wherein the first L-shaped slot is offset from an axis parallel to the opposing lateral edges and bisecting the rectangular panel.

11. The sun visor according to claim 10, further comprising a medially located second L-shaped slot extending inwardly from the second edge of the panel.

12. The sun visor according to claim 11, wherein the second L-shaped slot is offset from an axis parallel to the opposing lateral edges and bisecting the rectangular panel.

13. The sun visor according to claim 11, wherein each of the slots has a first leg and a second leg normal to the first leg, the legs of the first and second L-shaped slots having different widths, whereby the visor is adapted to slide onto a second rearview mirror post of different diameter.

14. The sun visor according to claim 10, wherein the panel is made from paper.

15. The sun visor according to claim 10, wherein the panel is made from cardboard.

16. The sun visor according to claim 10, wherein the panel is made from plastic.

17. The sun visor according to claim 10, wherein the panel has a length between about twelve and sixteen inches.

18. The sun visor according to claim 10, wherein the panel has a width between about four and eight inches.

* * * * *